(12) United States Patent
Taylor et al.

(10) Patent No.: US 8,510,395 B2
(45) Date of Patent: Aug. 13, 2013

(54) CONTACT LIST DISPLAY SYSTEM AND METHOD

(75) Inventors: Paulo Taylor, Amsterdam (NL);
Jan-Joost Rueb, Amsterdam (NL);
Onno Bakker, Amsterdam (NL)

(73) Assignee: eBuddy Holding B.V., Amsterdam (NL)

(*) Notice: Subject to any disclaimer, the term of this patent is extended or adjusted under 35 U.S.C. 154(b) by 0 days.

(21) Appl. No.: 12/774,700

(22) Filed: May 5, 2010

(65) Prior Publication Data

US 2010/0325222 A1     Dec. 23, 2010

Related U.S. Application Data

(63) Continuation of application No. 11/637,316, filed on Dec. 11, 2006, now abandoned.

(60) Provisional application No. 60/748,988, filed on Dec. 9, 2005.

(51) Int. Cl.
*G06F 15/16* (2006.01)
*G06F 15/173* (2006.01)

(52) U.S. Cl.
USPC .......................... 709/206; 709/203; 709/223

(58) Field of Classification Search
USPC ......... 709/213, 202–203, 206–207, 217–219, 709/223–224, 229, 246
See application file for complete search history.

(56) References Cited

U.S. PATENT DOCUMENTS

| | | | |
|---|---|---|---|
| 6,415,313 B1 | 7/2002 | Yamada et al. | |
| 6,415,318 B1 * | 7/2002 | Aggarwal et al. | 709/206 |
| 6,484,196 B1 | 11/2002 | Maurille | |
| 6,571,234 B1 | 5/2003 | Knight et al. | |
| 6,993,327 B2 * | 1/2006 | Mathis | 455/414.1 |
| 7,042,879 B2 | 5/2006 | Eschbach et al. | |

(Continued)

FOREIGN PATENT DOCUMENTS

| | | |
|---|---|---|
| EP | 1292071 | 9/2002 |
| WO | 9948011 | 9/1999 |

(Continued)

OTHER PUBLICATIONS

International Application No. PCT/IB2006/04193, International Search Report and Written Opinion mailed Jun. 24, 2008.

(Continued)

*Primary Examiner* — Bharat N Barot
(74) *Attorney, Agent, or Firm* — Sheppard Mullun Richter & Hampton LLP

(57) ABSTRACT

A technique for contact list aggregation across networks involves logging into low level networks through a high level network. A system constructed according to the technique may include a network interface coupled to the different low level networks. The system may further include a contact aggregation engine coupled to the network interface and a network contacts database. In operation the system logs into one or more of the low level networks (or facilitates login for a user). To the extent that the data in the network contacts database is not current, the contact aggregation engine updates the networks contacts database contact information, then provides an aggregated contact list including the contact information to a display device. A method according to the technique may include logging into a high level network and displaying contacts from the one or more low level networks in an aggregated contact list. The method may further include logging into the one or more low level networks.

11 Claims, 7 Drawing Sheets

(56) References Cited

U.S. PATENT DOCUMENTS

| | | | |
|---|---|---|---|
| 7,389,324 B2 * | 6/2008 | Masonis et al. | 709/206 |
| 7,426,382 B2 * | 9/2008 | Aerrabotu et al. | 455/411 |
| 7,496,379 B2 * | 2/2009 | Kaplan et al. | 455/557 |
| 7,512,619 B2 * | 3/2009 | Burkhardt | 705/7.13 |
| 7,523,138 B2 * | 4/2009 | Gruhl et al. | 1/1 |
| 7,636,755 B2 | 12/2009 | Blattner et al. | |
| 7,730,144 B2 * | 6/2010 | Taylor et al. | 709/206 |
| 7,779,076 B2 | 8/2010 | Heikes et al. | |
| 7,933,957 B2 | 4/2011 | Daniell et al. | |
| 8,037,212 B2 | 10/2011 | Taylor et al. | |
| 8,135,774 B2 * | 3/2012 | Ryabchun et al. | 709/203 |
| 2001/0026231 A1 | 10/2001 | Satoh | |
| 2002/0063735 A1 | 5/2002 | Tamir et al. | |
| 2002/0091770 A1 | 7/2002 | Takakura et al. | |
| 2002/0143916 A1 | 10/2002 | Mendiola et al. | |
| 2003/0028597 A1 | 2/2003 | Saimi et al. | |
| 2003/0076367 A1 | 4/2003 | Bencze et al. | |
| 2003/0088676 A1 | 5/2003 | Smith et al. | |
| 2003/0131061 A1 | 7/2003 | Newton et al. | |
| 2003/0210265 A1 | 11/2003 | Haimberg | |
| 2003/0222907 A1 | 12/2003 | Heikes et al. | |
| 2003/0225846 A1 | 12/2003 | Heikes et al. | |
| 2004/0010808 A1 | 1/2004 | DeCarmo | |
| 2004/0015547 A1 | 1/2004 | Griffin et al. | |
| 2004/0054646 A1 | 3/2004 | Daniell et al. | |
| 2004/0054802 A1 | 3/2004 | Beauchamp et al. | |
| 2004/0158609 A1 | 8/2004 | Daniell et al. | |
| 2004/0158610 A1 | 8/2004 | Davis et al. | |
| 2004/0221224 A1 | 11/2004 | Blattner et al. | |
| 2004/0243941 A1 | 12/2004 | Fish | |
| 2005/0038876 A1 * | 2/2005 | Chaudhuri | 709/219 |
| 2005/0080867 A1 | 4/2005 | Malik et al. | |
| 2005/0097061 A1 | 5/2005 | Shapiro et al. | |
| 2005/0108341 A1 | 5/2005 | Mathew et al. | |
| 2005/0114454 A1 | 5/2005 | D'Angelo et al. | |
| 2005/0187781 A1 | 8/2005 | Christensen | |
| 2005/0259656 A1 | 11/2005 | Dollar et al. | |
| 2005/0268237 A1 | 12/2005 | Crane et al. | |
| 2006/0080392 A1 | 4/2006 | Kawakami et al. | |
| 2006/0095562 A1 | 5/2006 | Agarwal et al. | |
| 2006/0168054 A1 | 7/2006 | Burkhart et al. | |
| 2006/0248157 A1 | 11/2006 | Daniell et al. | |
| 2006/0256816 A1 | 11/2006 | Yarlagadda et al. | |
| 2006/0265381 A1 | 11/2006 | Altaf et al. | |
| 2006/0268828 A1 | 11/2006 | Yarlagadda | |
| 2006/0271630 A1 | 11/2006 | Bensky et al. | |
| 2006/0277053 A1 | 12/2006 | Lobb et al. | |
| 2007/0043878 A1 | 2/2007 | Carlson et al. | |
| 2007/0135099 A1 | 6/2007 | Taylor et al. | |
| 2007/0136419 A1 | 6/2007 | Taylor et al. | |
| 2007/0168451 A1 | 7/2007 | Taylor et al. | |
| 2007/0168529 A1 | 7/2007 | Taylor et al. | |
| 2007/0168558 A1 | 7/2007 | Taylor et al. | |
| 2007/0192479 A1 | 8/2007 | Felten | |
| 2008/0182559 A1 | 7/2008 | Pyhalammi et al. | |
| 2009/0125591 A1 | 5/2009 | Kirkpatrick | |
| 2010/0099421 A1 | 4/2010 | Patel et al. | |
| 2010/0228747 A1 | 9/2010 | Taylor et al. | |

FOREIGN PATENT DOCUMENTS

| | | |
|---|---|---|
| WO | 0120474 | 3/2001 |
| WO | 0143357 | 6/2001 |
| WO | 03056764 | 7/2003 |
| WO | 2004031976 | 4/2004 |
| WO | 2004079530 A2 | 9/2004 |
| WO | 2005045591 | 5/2005 |
| WO | 2005074588 | 8/2005 |
| WO | 2006083820 | 8/2006 |
| WO | 2007063041 | 6/2007 |
| WO | 2007110703 | 10/2007 |
| WO | 2007129143 | 11/2007 |
| WO | 2007129144 | 11/2007 |
| WO | 2007072028 | 6/2008 |
| WO | 2008072030 | 6/2008 |

OTHER PUBLICATIONS

International Application No. PCT/IB2006/04200, International Search Report and Written Opinion mailed Oct. 23, 2007.

International Application No. PCT/IB2006/04204, International Search Report and Written Opinion mailed Jan. 8, 2008.

International Application No. PCT/IB2006/04205, Corrected International Search Report and Written Opinion mailed Apr. 4, 2008.

International Application No. PCT/IB2006/04264, International Search Report and Written Opinion mailed Jun. 30, 2008.

International Application No. PCT/US2012/000046, International Search Report and Written Opinion mailed Apr. 2, 2012.

U.S. Appl. No. 11/637,964, Final Office Action mailed Dec. 17, 2010.

U.S. Appl. No. 11/637,514, Final Office Action mailed Jan. 18, 2011.

U.S. Appl. No. 11/637,514, Final Office Action mailed Oct. 27, 2010.

U.S. Appl. No. 11/637,514, Notice of Allowance mailed Jun. 7, 2011.

U.S. Appl. No. 11/637,964, Non-Final Office Action mailed Jul. 27, 2010.

U.S. Appl. No. 13/165,709, Non-Final Office Action mailed Nov. 10, 2011.

U.S. Appl. No. 11/637,268, Final Office Action mailed Oct. 6, 2011.

English Abstract of W0-2003-056764 dated Jul. 10, 2003.

English Abstract of EP-1292071 dated Sep. 5, 2002.

Non-Final Office Action mailed May 18, 2009 and Final Office Action mailed Nov. 5, 2009 in U.S. Appl. No. 11/637,316, filed Dec. 11, 2006.

Office Action mailed on Mar. 21, 2011 in U.S. Appl. No. 11/637,268, filed Dec. 11, 2006.

Office Actions mailed on Dec. 30, 2009, Jun. 25, 2009, and Apr. 29, 2010 in U.S. Appl. No. 11/637,514, filed Dec. 11, 2006.

Non-Final Office Action mailed Jul. 30, 2009, in U.S. Appl. No. 11/637,954, filed Dec. 11, 2006.

Notice of Allowance mailed Jan. 28, 2010, in U.S. Appl. No. 11/637,954, filed Dec. 11, 2006.

Non-Final Office Action mailed Sep. 3, 2009 and Final Office Action mailed Feb. 9, 2010, in U.S. Appl. No. 11/637,964, filed Dec. 11 2006.

* cited by examiner

CONTACT LIST DISPLAY SYSTEM AND METHOD

CROSS-REFERENCE TO RELATED APPLICATIONS

This Patent Application is a continuation of U.S. patent application Ser. No. 11/637,316, filed Dec. 11, 2006 now abandoned and entitled CONTACT LIST DISPLAY SYSTEM AND METHOD, which claims priority to U.S. Provisional Patent App. No. 60/748,988, filed Dec. 9, 2005, which is incorporated herein by reference. This Patent Application is related to U.S. patent application Ser. Nos. 11/637,954, 12/721,538, 11/637,268, 11/637,964, 11/637,514, by Taylor, et al., respectively entitled HIGH LEVEL NETWORK LAYER SYSTEM AND METHOD, HIGH LEVEL NETWORK LAYER SYSTEM AND METHOD, PICTURE PROVISIONING SYSTEM AND METHOD, MESSAGE HISTORY DISPLAY SYSTEM AND METHOD, and EVENT NOTIFICATION SYSTEM AND METHOD, filed concurrently herewith and incorporated by reference herein.

BACKGROUND

Instant messaging requires the use of a client program that hooks up an instant messaging service and differs from e-mail in that conversations are then able to happen in real time. Most services offer a presence information feature, indicating whether people on one's list of contacts are currently online and available to chat. This may be called a contact list. In early instant messaging programs, each letter appeared as it was typed, and when letters were deleted to correct typos this was also seen in real time. This made it more like a telephone conversation than exchanging letters. In modern instant messaging programs, the other party in the conversation generally only sees each line of text right after a new line is started. Most instant messaging applications also include the ability to set a status message, roughly analogous to the message on a telephone answering machine.

Popular instant messaging services on the public Internet include .NET Messenger Service, AOL Instant Messenger, Excite/Pal, Gadu-Gadu, Google Talk, iChat, ICQ, Jabber, Qnext, QQ, Meetro, Skype, Trillian and Yahoo! Messenger. These services owe many ideas to an older (and still popular) online chat medium known as Internet Relay Chat (IRC).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for contact list aggregation across a plurality of different networks involves logging into low level networks through a high level network. A system constructed according to the technique may include a network interface coupled to the different low level networks. The system may further include a contact aggregation engine coupled to the network interface and a network contacts database. In operation the system logs into one or more of the low level networks (or facilitates login for a user). The network contacts database may include some information about contacts associated with the networks from, by way of example but not limitation, previous logins or data explicitly entered by a user. To the extent that the data in the network contacts database is not current, the contact aggregation engine updates the networks contacts database contact information, then provides an aggregated contact list including the contact information to a display device.

A method according to the technique may include logging into a high level network and displaying contacts from the one or more low level networks in an aggregated contact list. The method may further include logging into the one or more low level networks.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
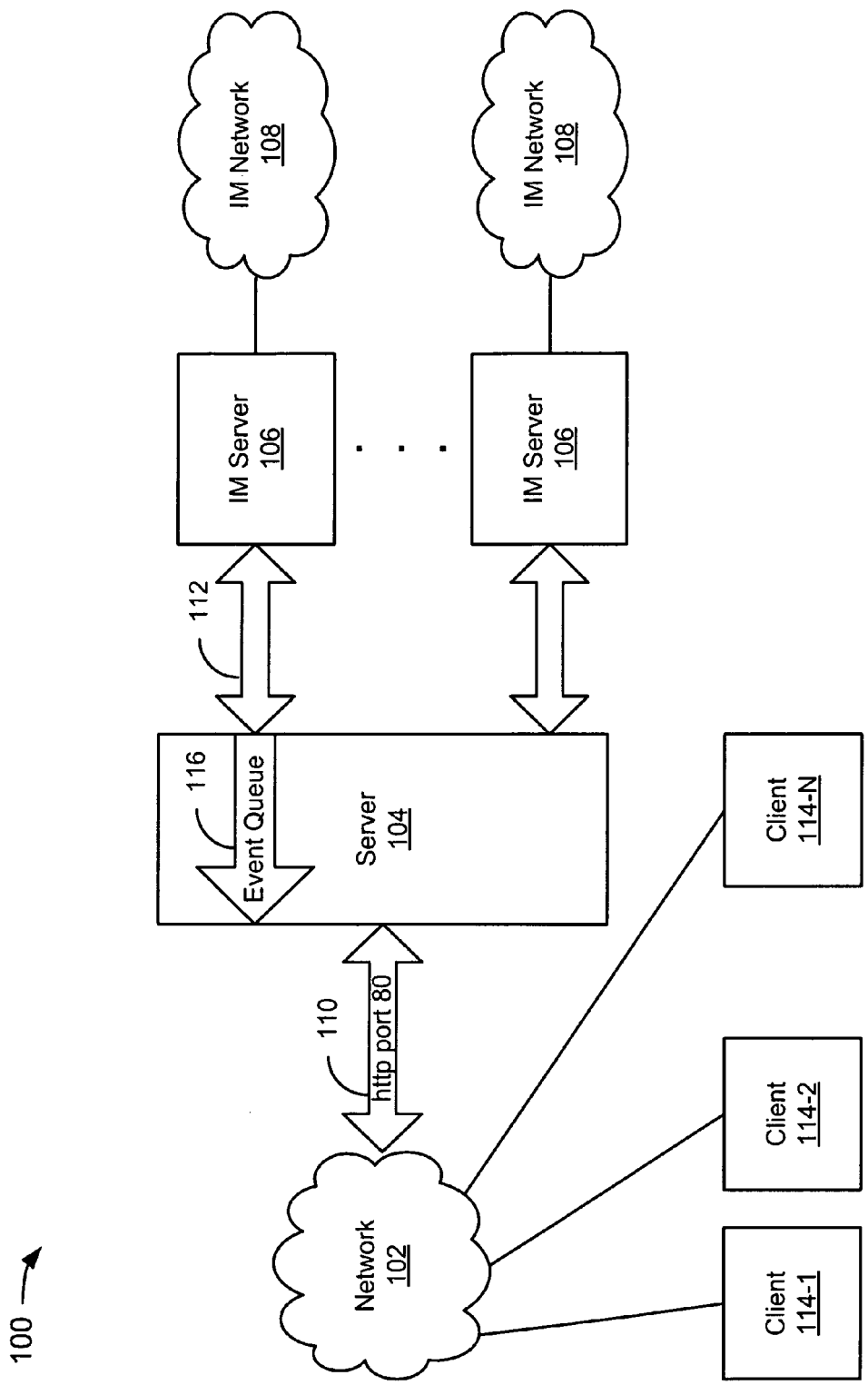
FIG. 1 depicts an example of a system for providing instant messages to clients via a web interface.

FIG. 1 depicts an example of a system 100 for providing instant messages to clients via a web interface. In the example of FIG. 1, the system 100 includes a network 102, a server 104, and an Instant Messenger (IM) server 106, and an IM network 108. The server 104 is coupled to the network at least by way of port 80. The two way communication via port 80 is represented in the example of FIG. 1 as an arrow 110. The server 104 is coupled to the IM server 106 via one or more other ports. The two way communication via the other ports is represented in the example of FIG. 1 as an arrow 112. The IM server 106 is coupled to the IM network 108 via any known or convenient mechanism. Indeed, the IM server 106 may be thought of as part of the IM network 108. The network 102 couples a plurality of clients 114-1 to 114-N (referred to collectively as clients 114) to the server 104. In the example of FIG. 1, the server 104 includes an event queue 116.

The network 102 may include by way of example but not limitation LAN, WAN, VLAN, WLAN, Internet, cellular network, phone network, radio network, or some other known or convenient network. The term "Internet" as used herein refers to a network of networks that uses certain protocols, such as TCP/IP, and possibly other protocols such as the hypertext transfer protocol (HTTP) for hypertext markup language (HTML) documents that make up the World Wide Web (the web). The physical connections of the Internet and the protocols and communication procedures are well known, but any convenient physical connections or protocols could be used.

The server 104 may include a multiple servers. Indeed, it may be desirable, depending upon details of a particular implementation, to install several servers to cope with the number of simultaneous users the system 100 supports. It may further be desirable, depending upon details of a particular implementation, for the server 104 to have a high CPU throughput, together with large amounts of RAM, to handle a large number of users. It may further be desirable, depending upon details of a particular implementation, to accomplish resource sharing via thread handling where a pool of threads is shared and used by one or more of the clients 114 for client-server communication and between the server 104 and the IM server 106.

The server 104 may include one or more of an application server, database server, web server, banners server, and content server, or any combination thereof. To make the most of the techniques described herein, the server 104 should, though is not required to, include at least one application server. The other servers can have supporting roles in, by way of example but not limitation, serving static content or advertising (e.g., banners), storing usage data, or fulfilling some other known or convenient function.

The server 104 may act as a proxy server between the clients 114 and the IM server 106. The server 104 receives communications from the clients 114 on http port 80, and responds to the clients 114 on http port 80. Communications from the clients 114 that are bound for the IM network 108, however, must also come through http port 80 to the server 104, and are then forwarded to the IM server 106. In this way, the server 104 acts as a carrier of the data from users to the IM network 108 using a mechanism that controls and manages the data (e.g., text messages, display images, emoticons, audio/video streams, etc.) sent between one of the clients 114 and the server 104, and vice versa.

The IM server 106 may be any known or convenient IM server that is compatible with IM. Events, messages, or other appropriate data from the IM server 106 are collected in the event queue 116 of the server 104. The events may be collected in association with a variety of protocols including by way of example but not limitation port 1863, port 5050, port 5222, port 5190, etc.

The IM network 108 may include one or a combination of networks selected from MSN Messenger, Yahoo! Messenger, AIM AOL, ICQ, QQ, Jabber, Google Talk, IRC, or some other known or convenient IM network.

The clients 114 may include any known or convenient device, including by way of example but not limitation, a Web browser, mobile client, PDA, game console, TV box, native application, etc. The clients poll the server 104 for events. The events can be removed from the event queue 116 and translated into text, JavaScript, XML, or some other known or convenient format that one or more of the clients 114 need or expect in order to process data associated with the event.

To interact with the IM network 108, the clients 114 send data to the server 104. The data, which may include commands, is processed and translated into corresponding data that will be sent to the appropriate IM network. In an embodiment, the appropriate IM network may be determinable based upon the protocol encoded in a message.

Messages or actions from the clients 114 are collected over network protocols such as, by way of example but not limitation, HTTP or plain socket connections. The messages or actions are transformed to an appropriate protocol format to be sent over a compliant port from the clients 114 to the server 104, with the IM protocol on the application side. In a non-limiting embodiment, the compliant port is http port 80. However, any port having similar characteristics to those of a typical port 80 could be used.

The latest available browsers, as of December 2005, enable the use of a technique called AJAX (Asynchronous JavaScript And XML). With AJAX, appropriately configured clients 114 can execute actions and poll for messages or events using only JavaScript. The method is based on using an XMLHttpRequest object to make HTTP requests to the server 104. The server 104 may reply with messages taken from the queue of the corresponding session in XML (or another) format that are parsed and displayed according to the message content.

For clients 114 that include a browser, when accessing the server 104 the browser typically uses hidden HTML frames to update information on visible frames. The visible frames display appropriate information while the hidden frames are reloaded in short periods of time. In each refresh that hits the server 104, the browser identifies the current messaging session and checks if new events or messages associated with the session are in the event queue 116. When new information arrives and needs to be displayed in some form, the browser makes use of, for example, JavaScript code to update the visible frames and windows with new messages or events keeping the information up to date in the screen. In this way, automatic refreshing can take place in a hidden frame.

In another embodiment, certain of the clients 114 with browsers may not make use of refreshes. For example, a form of updating the screen without using a refresh technique is to keep one single HTTP socket request alive for the whole period of a messaging session without actually closing the socket connection. In this example, information is initially loaded and displayed in one single visible frame. While events and messages are being received by the server 104, JavaScript code can be injected into the HTML document through the same HTTP socket kept alive and managed by the server 104. For each event or message, the browser can interpret the JavaScript code injected and the corresponding parts of the HTML document and windows will be updated.

In another embodiment, certain of the clients 114 with browsers may make use of manual refreshes. Some relatively unsophisticated browsers, such as WAP and xHTML browsers often available on mobile phones, do not support hidden frames and/or JavaScript (and others may be configured such that they do not support hidden frames and/or JavaScript). In such cases, the information displayed has to be updated manually by the user. Manual updating enables any mobile phone, PDA, TV Set or any device with a browser to connect to the server 104 and use the messaging platforms made available by the server 104 assuring the communication between the clients 114 and the IM server 106.

Message history can be stored by most IM clients on a local computer. For alternative web and mobile-based clients local storage may not be possible. In a non-limiting embodiment, the server 104, may have the capability to store message history from IM conversations done via one or more of the clients 114. The message history can be accessed and searched at any time via the server 104 by one or more of the clients 114

Figure 2:
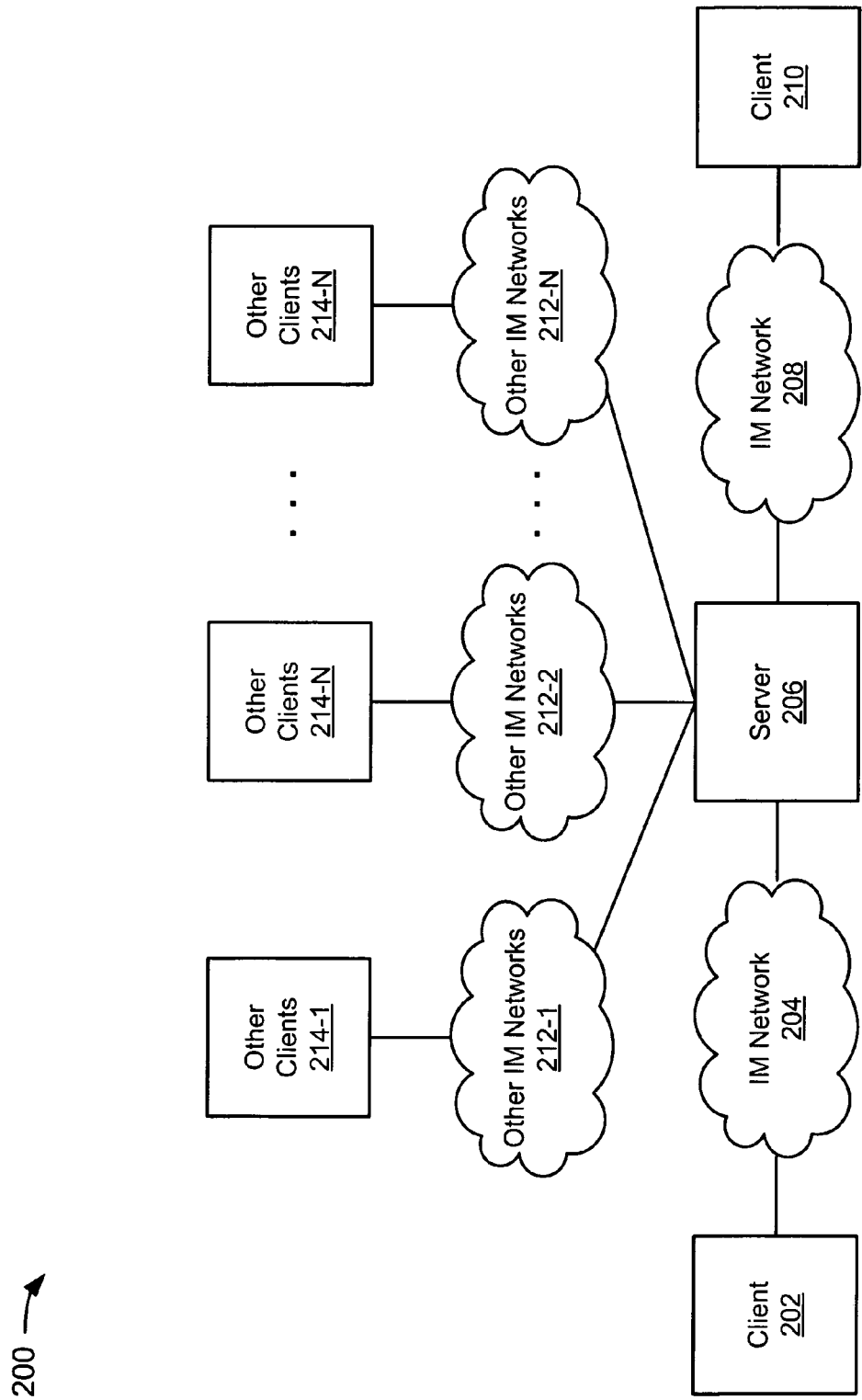
FIG. 2 depicts an example of a system for displaying content from an IM client at an alternative IM client.

FIG. 2 depicts an example of a system 200 for displaying content from an IM client at an alternative IM client. In the example of FIG. 2, the system 200 includes a client 202, an IM network 204, a server 206, an IM network 208, a client 210, other IM networks 212-1 to 212-N (referred to collectively as other IM networks 212), and other clients 214-1 to 214-N (referred to collectively as other clients 214).

For illustrative purposes, it is assumed that the client 202 has content that is compatible with the IM network 204. However, the client 210 is capable of reading content formatted to be compatible with the IM network 208. Thus, in operation, the server 206 collects content from the client 202 (either through the IM network 204, as shown in FIG. 2, or directly from the client 202, such as is shown by way of example in FIG. 1). The server 206 then formats the content as appropriate for use on the IM network 208. Once the content is properly formatted, it can be made available to the client 210 (either through the IM network 208, as shown in FIG. 2, or directly to the client 210, such as is shown by way of example in FIG. 1). Depending upon the embodiment and/or implementation, the content may also be formatted as appropriate for one or more of the other IM networks 212, to be made available for one or more of the other clients 214.

In an embodiment, the server 206 can save the content in one or many formats. In this way, the client 202 could make content available in a first IM format, the server 206 could convert the content into a second IM format, and the server 206 can save the content in at least the second IM format. Thus, the client 210 could receive the data in the second IM format. The server 206 could easily store the content in the first IM format, as well, and make the content available to other clients coupled to the IM network 204. In addition, the server 206 could convert the content to other IM formats, such as those formats that are associated with the other IM networks 212, and save the other IM formats. In this way, the other clients 214 may have access to the content.

In a non-limiting embodiment, the client 202 may be able to view the client 210 and the clients 214 simultaneously. This is advantageous because IM clients typically cannot view IM clients from other IM networks. Advantageously, since the server 206 is used, the client 202 could even include, for example, a mobile device without a client. (Of course, this could be interpreted to mean that the client 202 is not an IM client at all, though the term client is still used for illustrative purposes because the client 202 is served by the server 206 in a client-server-like fashion.) In a non-limiting embodiment, if the client 202 does not or cannot install client software, the client 202 can use a browser for web-based messaging and display.

Figure 3:
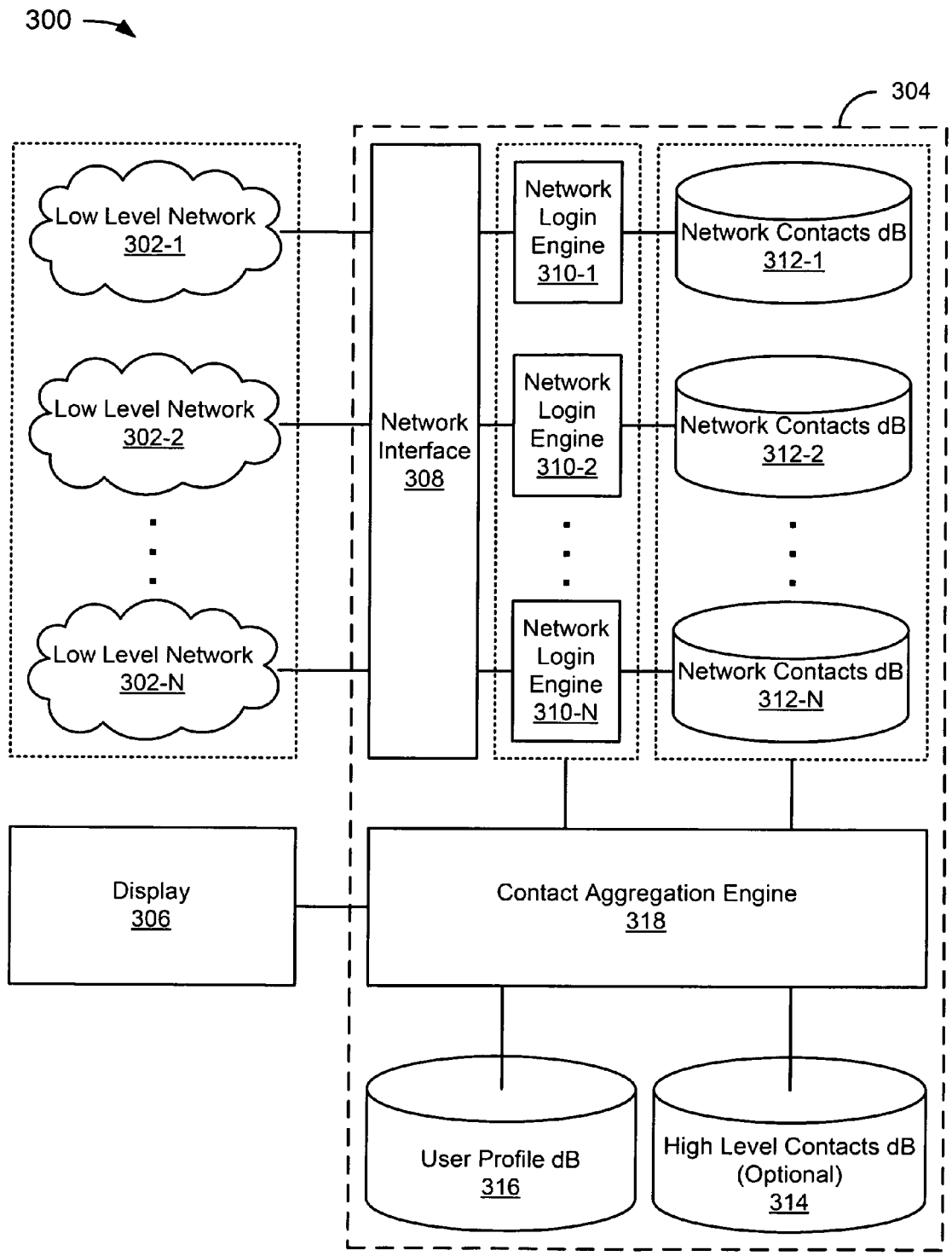
FIG. 3 depicts an example of a system capable of contact aggregation and display.

FIG. 3 depicts an example of a system 300 capable of contact aggregation and display. The system 300 includes low level networks 302-1 to 302-N (collectively referred to as the low level networks 302), a computer 304, and a display 306. The low level networks 302 may include, by way of example but not limitation, various IM networks. It may be noted that the computer 304 and the display 306 may be referred to, in certain implementations, as comprising a computer system.

The computer 304 includes a network interface 308, network login engines 310-1 to 310-N (collectively referred to as network login engines 310), network contacts databases 312-1 to 312-N (collectively referred to as the network contacts database 312), a high level contacts database 314, a user profile database 316, and a contact aggregation engine 318.

The network interface 308 is coupled to the low level networks 302. In a typical implementation, the network interface 308 also couples the computer 304 to a network such as the Internet and/or a high level network (not shown).

The network login engines 310 may include logic and storage that facilitates login to the various low level networks 302. For example, the network login engine 310-1 may include a user name (and perhaps a password, if the password is not requested from the user at each login) associated with the low level network 302-1. Conceptually, each of the network login engines 310 is intended to represent the capability of login to the low level networks 302 in a general sense (i.e., the data and logic required for any device to connect to the low level networks 302) and a user-specific sense (e.g., the data provided from a user that enables login to accounts associated with the user).

The network contacts database 312, which is embodied in a computer-readable medium, includes contacts data associated with any of the networks into which a user has logged. When a user logs out, the data may or may not be cached (or stored in non-volatile memory) for future reference, depending upon the implementation and/or user configuration.

The high level contacts database 314, which is embodied in a computer-readable medium, is an optional database that includes contacts associated with a high level network. The high level contacts database 314 is optional for at least two reasons. The first reason is that a system need not provide the ability to maintain high level contacts, requiring that a user maintain only low level contacts. The second reason is that even if the system provides the ability to maintain high level contacts, a user may opt not to maintain any high level contacts, opting instead for low level contacts.

The user profile database 316, which is embodied in a computer-readable medium, is intended to represent data associated with a user. The amount of data maintained is implementation-specific.

The contact aggregation engine 318 is coupled to the databases 312, 314, 316, the network login engines 310, and the display 306. In operation, the contact aggregation engine 318 controls the network login engines 310 to login to or facilitate login by a user to the various low level networks 302. The databases 312, 314, 316 are accessed in such a way that a list of contacts stored in the network contacts database 312 is aggregated and displayed on the display 306, as illustrated by the screenshots of FIGS. 4A-4B, and the flowcharts of FIGS. 5-6.

Figure 4A:
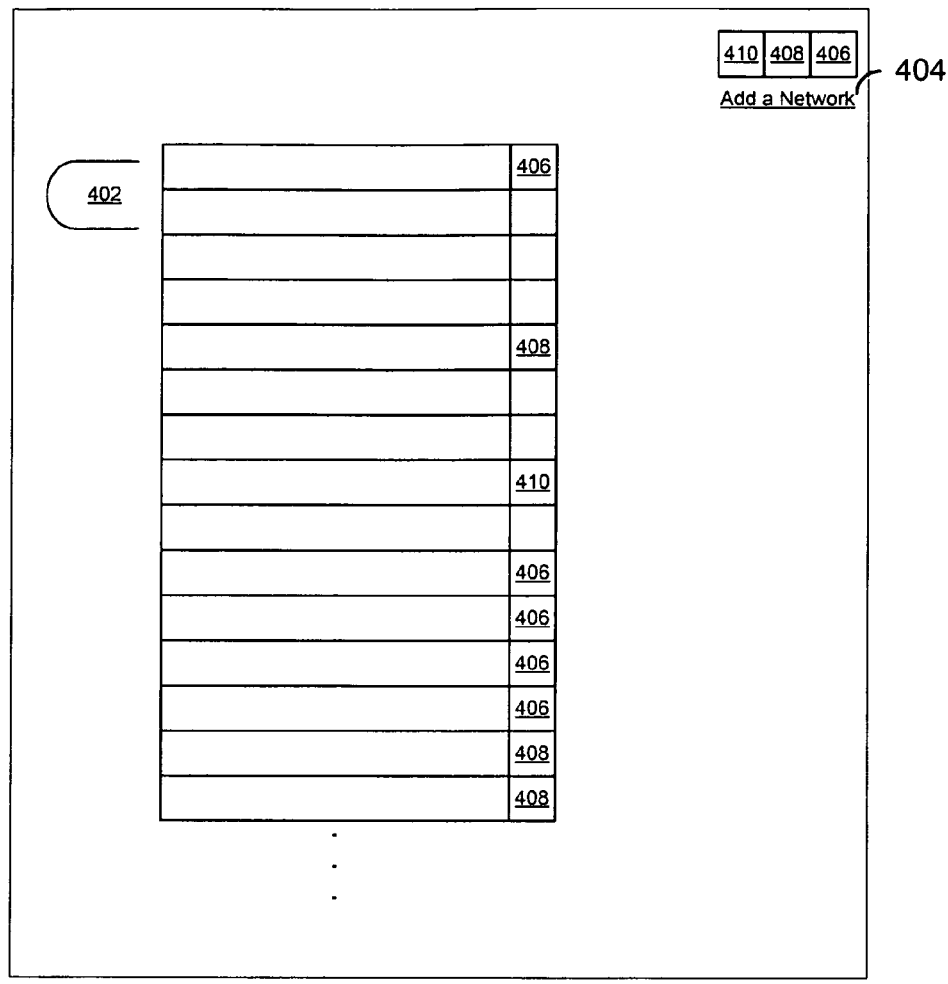
FIGS. 4A-4B depict examples of screenshots that depicts a multi-network IM display.
Figure 4B:
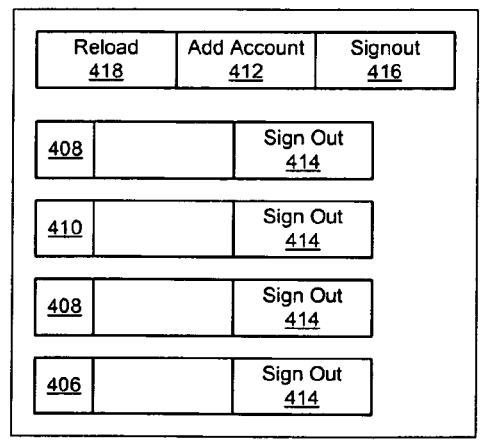

FIGS. 4A-4B depict examples of screenshots that depicts a multi-network IM display. In many cases, a user will login to a high level account and adjust user configurations such that the system will automatically login the user to various low level accounts. This may require storing login credentials so that the system can automatically login the user to each selected interface. FIG. 4A depicts an example of a screenshot 400A for a full screen display. In the example of FIG. 4A, the screenshot 400A includes a contacts list tab 402, an "add a network" hyperlink 404, a plurality of MSN icons 406, a plurality of Yahoo! icons 408, and a plurality of AIM icons 410.

As the name implies, the contacts list tab 402 includes a listing of designated IM client contacts. For an IM client to be included in the listing, a user associated with the contact list typically must explicitly enter a client into the list. This may be accomplished with a single click. For example, when a new IM client contacts the user, the user may be prompted to allow the IM client to be entered into the user's contacts list.

As is suggested by the folders depicted in the contacts list tab 402, a user may organize contacts in various folders. A single contact may be listed in no folders, one folder, or multiple folders, depending upon implementation and user configurations. Depending upon the implementation details, all contacts who are not currently online are listed in the "Offline" folder.

The "add a network" hyperlink 304 can be followed to add networks for display. In a non-limiting embodiment, when a network is added, contacts of the user in the added network are added to the contacts list tab 402. The added contacts are distinguishable by network using, for example, the icons 406, 408, 410.

In an alternative embodiment, the contact list could be maintained in a high level network (i.e., all contacts are listed in the contact list, even if the contacts are from a network that has not been added). If a contact is a member of a network that is not added, the contact would presumably be listed in the "Offline" folder because the contact is not known to the user to be online. However, depending upon the implementation, the "Offline" folder could be effectively split into two folders, if desired, one which indicates a contact is offline, and one that indicates a contact is a member of a network that has not been added. In the example of FIG. 4A, this is implicit because the added networks have icon 406, 408, 410 associated with them, and each of the contacts have icons 406, 408, 410 associated with them. So, it is apparent from viewing the display whether a contact is or is not a member of a network that is currently added.

In a non-limiting embodiment, adding a network requires that the user be a member of the added network. For example, if the user wishes to add the MSN IM network, the user must have an IM account with MSN. However, in an alternative embodiment, a system could set up a dummy account for a user who wishes to add an account for a network with which the user is not a member. The dummy account will be associated with the user, but the user might feel more comfortable with not ever logging in, remembering a password, etc. The system could handle all of these details for the user without the user's knowledge, and without exposing the user to security risks such as compromised passwords (since some users use the same password for multiple accounts, but in this case the system would generate a random, and presumably strong, password for use with the account).

FIG. 4B depicts an example of a screenshot 400B for a mobile phone display. In the example of FIG. 4B, the contact list includes a series of contacts and their associated network-identifying icons 406, 408, 410. The information available on a mobile phone display is less than that of a full screen display, such as is available on, for example, a laptop display.

In the example of FIG. 4B, a user can add accounts by clicking on an "add account" hyperlink 412. Depending upon the implementation, clicking on the "add account" hyperlink 412 could prompt the user to select an account from a list of accounts the user has already designated in a contacts list (or add a new account), to select a list of accounts associated with a particular subset (see, e.g., the folders of FIG. 4A), to select a particular network (which may include logging the user in to the network or prompting the user to do so), storing login credentials and, when logging in, the system can automatically login the user to each selected interface, or to select accounts in some other manner. Presumably, if an account is selected for a contact that is a member of a network in which the user has not logged in, in a non-limiting embodiment, either the user or the system will have to login to the network.

In the example of FIG. 4B, the user can remove accounts from the online list by clicking on a "signout" hyperlink 414 next to the accounts. Depending on the implementation, clicking on the "signout" hyperlink 414 may cause the user to go offline with respect to the account associated with the particular "signout" hyperlink, or with all accounts on the same network as the account associated with the particular "signout" hyperlink. A "signout" hyperlink 416 may be used to sign out of all networks at once or, in a different implementation, cause the user to be prompted regarding the networks from which to sign out.

In the example of FIG. 4B, the screenshot 400B includes a "reload" hyperlink 418. It may be desirable to occasionally refresh the screen. Some mobile devices may even be incapable of refreshing without an explicit reload.

Figure 5:
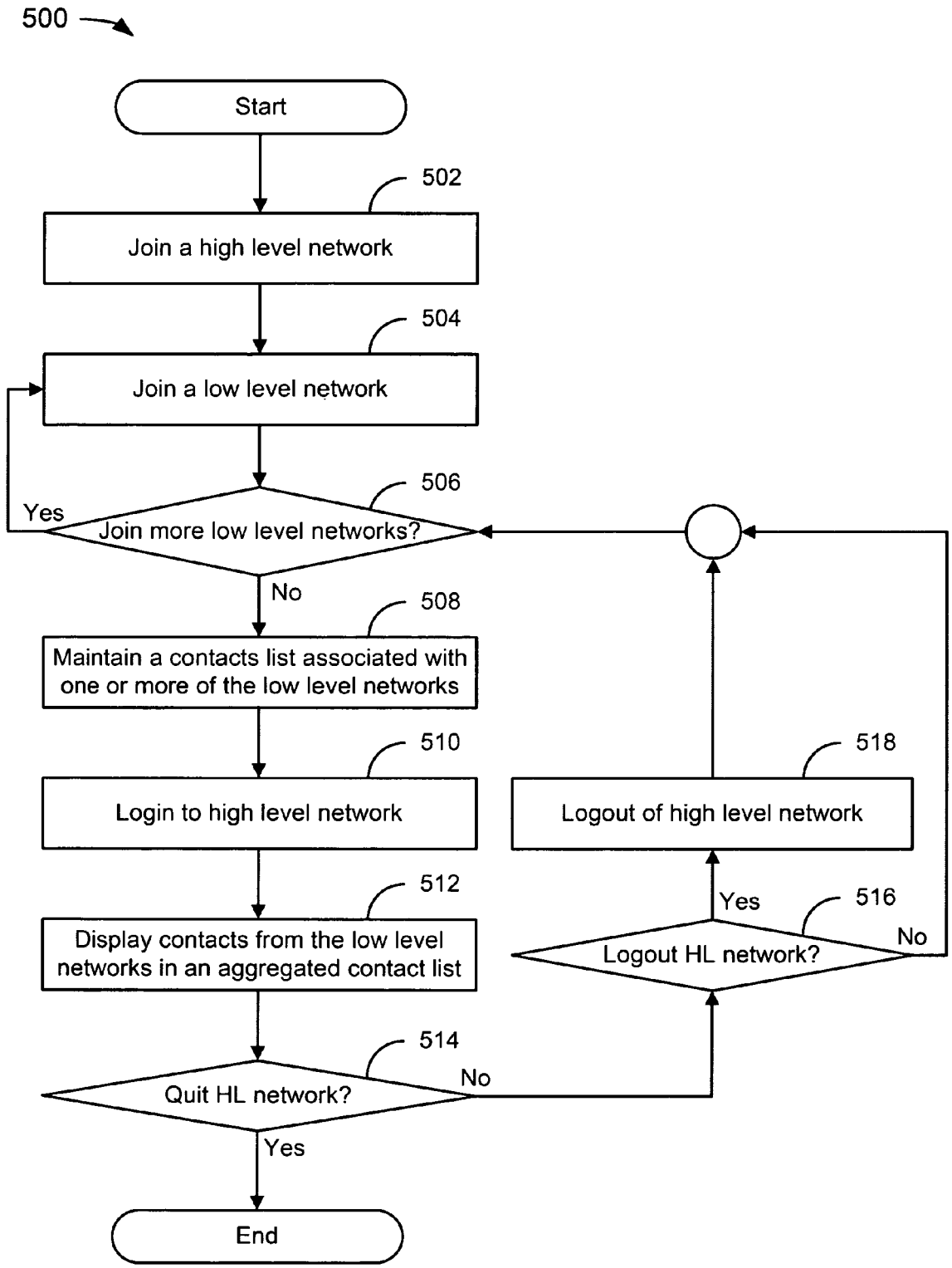
FIG. 5 depicts a flowchart of an example of a method for contact list aggregation and display.

FIG. 5 depicts a flowchart 500 of an example of a method for contact list aggregation and display. This method and other methods are depicted as serially arranged modules. However, modules of the methods may be reordered, or arranged for parallel execution as appropriate. In the example of FIG. 5, the flowchart 500 begins at module 502 where a high level network is joined. A high level network may include, by way of example but not limitation, eBuddy.

In the example of FIG. 5, the flowchart 500 continues to module 504 where a low level network is joined. Low level networks may include IM networks, such as MSN Messenger, Yahoo! Instant Messenger, AIM, or any other known or convenient network. It should also work properly if high level networks were joined as if the high level networks were low level. For example, a member of a first high level network could join a second high level network, which in turn is associated with first and second low level networks. The second high level network would function rather like a node in a tree, where the first high level network is the root, and the leaves of the node are the first and second low level networks. Thus, the second high level network could be thought of as a mid-level network. Unless a distinction is needed, mid-level networks are treated as low level networks herein.

In the example of FIG. 5, the flowchart 500 continues to decision point 506 where it is determined whether to join more low level networks. If it is determined that more low level networks are to be joined (506-Y), then the flowchart 500 loops back to module 504, as described previously. If, on the other hand, it is determined that no more low level networks are to be joined (506-N), then the flowchart 500 continues to module 508 where a contact list associated with one or more of the low level networks is maintained.

While contact lists are not particularly important in email environments (because you can write an email to anyone whose email address you know), in IM environments, contact lists are more desirable because users want to see who is online before sending an IM. If a contact is not online, IM is not allowed in many implementations (and in an implementation that "allows" IM with an offline contact, the communication is arguably not an instant message). Accordingly, at least in an IM environment, most users will maintain a contact list (508).

In the example of FIG. 5, the flowchart 500 continues to module 510 where the high level networks is logged into. When a user logs into a high level network, the user will typically have a number of options, including requesting that a list of contacts be displayed. The list of contacts could also be displayed automatically upon login, depending upon the implementation and user configurations.

In the example of FIG. 5, the flowchart 500 continues to module 512 where contacts from each of the low level networks are displayed in an aggregated contact list. Depending upon the implementation or user configuration, the contact list could include high level contacts, too. Also depending upon the implementation and/or user configuration, the user may or may not be required to login to each of the low level networks for which contacts are to be displayed in the aggregated contact list.

In the example of FIG. 5, the flowchart 500 continues to decision point 514 where it is determined whether to quit the high level network. If the user does not quit the high level network (514-N), then the flowchart 500 continues to decision point 516 where it is determined whether the user logs out of the high level network. If it is determined that the user is to logout of the high level network (516-Y), then the flowchart 500 continues to module 518 where the user logs out. Whether the user logs out (516-Y, 518), or not (516-N), the flowchart 500 loops back to decision point 506, as described previously.

In many cases, a user may never quit the high level network, however it is theoretically possible that a user would quit (or a user would be banned). If the user quits or is banned from the high level network (514-Y), then the flowchart 500 ends.

Figure 6:
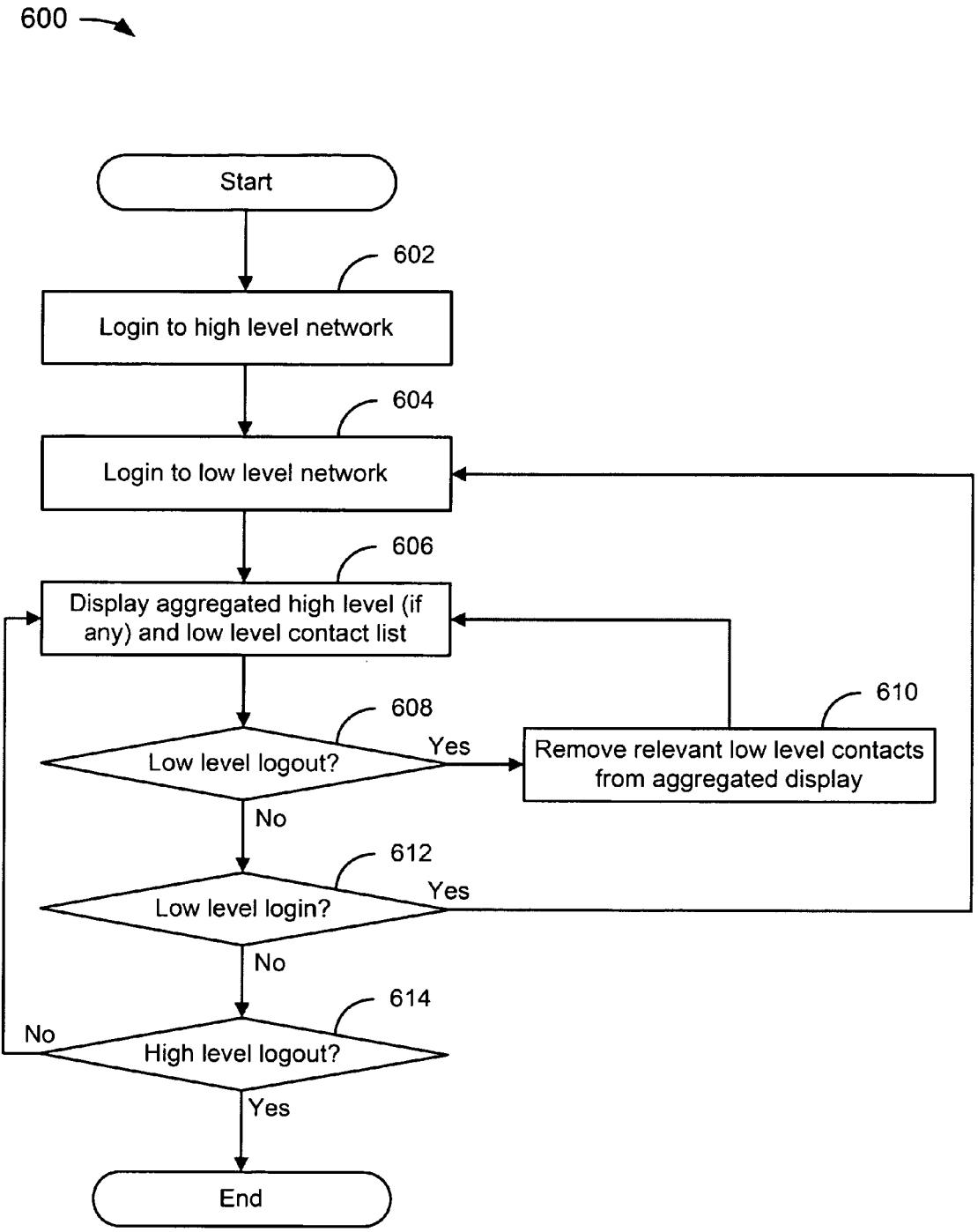
FIG. 6 depicts a flowchart of an example of a method for aggregated contact list display.

FIG. 6 depicts a flowchart 600 of an example of a method for aggregated contact list display. In the example of FIG. 6, the flowchart 600 starts at module 602 where a member logs into a high level network.

In the example of FIG. 6, the flowchart 600 continues to module 604 where a user logs into a low level network through the high level network. Depending upon the implementation and/or user configurations, the user may be logged into the low level network automatically when logging into the high level network, explicitly by the user, or the user may be logged into the low level network when the user selects a contact that is associated with the low level network.

In the example of FIG. 6, the flowchart 600 continues to module 606 where high level and low level contacts are displayed in an aggregated contact list. It may be noted that a user may not have a high level contact list, either because a high level system does not allow for contact lists, or because the user does not opt to maintain any contact lists at the high level.

In the example of FIG. 6, the flowchart 600 continues to decision point 608 where it is determined whether to logout of the low level network. If it is determined to logout of the low level network (608-Y), then the flowchart 600 continues to module 610 where the relevant low level contacts are removed from the aggregated display, and the flowchart 600 loops back to module 606, as described previously. The relevant low level contacts are those contacts that are in the contact list associated with the low level network from which logout was elected. If, on the other hand, it is determined not to logout of the low level network (608-N), then the flowchart 600 continues to decision point 612.

In the example of FIG. 6, the flowchart 600 continues to decision point 612 where it is determined whether to login to a low level network. It is possible to login to an implementation-specific number of low level networks (or, in the alternative, practically any number of low level networks). If it is determined to login to a low level network (612-Y), then the flowchart 600 loops back to module 604, as described previously. If, on the other hand, it is determined not to login to a low level network (612-N), then the flowchart 600 continues to decision point 614, where it is determined whether to logout of the high level network. If not (614-N), the flowchart 600 loops back to module 606, as described previously. If so (614-Y), then the flowchart 600 ends.

Figure 7:
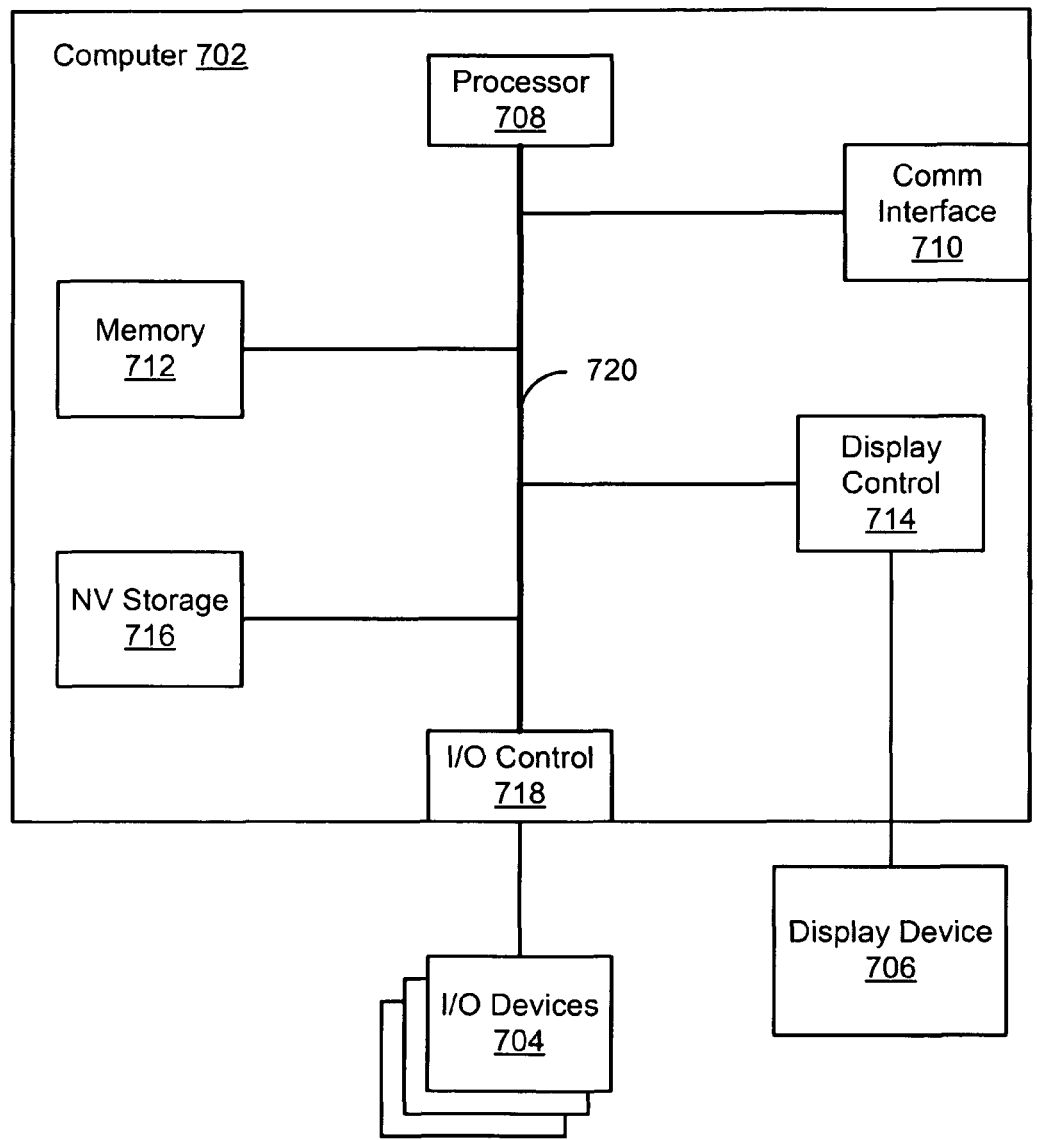
FIG. 7 depicts a computer system suitable for implementation of the techniques described with reference to FIGS. 1-6.

FIG. 7 depicts a computer system 700 suitable for implementation of the techniques described above with reference to FIGS. 1-6. The computer system 700 includes a computer 702, I/O devices 704, and a display device 706. The computer 702 includes a processor 708, a communications interface 710, memory 712, display controller 714, non-volatile storage 716, and I/O controller 718. The computer 702 may be coupled to or include the I/O devices 704 and display device 706.

The computer 702 interfaces to external systems through the communications interface 710, which may include a modem or network interface. The communications interface 710 can be considered to be part of the computer system 700 or a part of the computer 702. The communications interface 710 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 710 optional in the strictest sense of the word.

The processor 708 may include, by way of example but not limitation, a conventional microprocessor such as an Intel Pentium microprocessor or Motorola power PC microprocessor. While the processor 708 is a critical component of all conventional computers, any applicable known or convenient processor could be used for the purposes of implementing the techniques described herein. The memory 712 is coupled to the processor 708 by a bus 720. The memory 712, which may be referred to as "primary memory," can include Dynamic Random Access Memory (DRAM) and can also include Static RAM (SRAM). The bus 720 couples the processor 708 to the memory 712, and also to the non-volatile storage 716, to the display controller 714, and to the I/O controller 718.

The I/O devices 704 can include a keyboard, disk drives, printers, a scanner, and other input and output devices, including a mouse or other pointing device. For illustrative purposes, at least one of the I/O devices is assumed to be a block-based media device, such as a DVD player. The display controller 714 may control, in a known or convenient manner, a display on the display device 706, which can be, for example, a cathode ray tube (CRT) or liquid crystal display (LCD).

The display controller 714 and I/O controller 718 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 716, which may be referred to as "secondary memory," is often a magnetic hard disk, an optical disk, or another form of storage for large amounts of data. Some of this data is often written, by a direct memory access process, into memory 712 during execution of software in the computer 702. The non-volatile storage 716 may include a block-based media device. The terms "machine-readable medium" or "computer-readable medium" include any known or convenient storage device that is accessible by the processor 608 and also encompasses a carrier wave that encodes a data signal.

The computer system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

The computer system 700 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-in-Time (JIT) compiled from bytecode (e.g., Java). Any known or convenient computer, regardless of architecture, should be capable of executing machine code compiled or otherwise assembled from any language into machine code that is compatible with the computer's architecture.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
a network login engine;
a network contacts database embodied in one or more non-transitory computer readable mediums;
a web server coupled to the network contacts database;
a contact aggregation engine coupled to the network login engine and the network contacts database;
wherein, in operation, the contact aggregation engine:
controls the network login engine to login or facilitate login to a first network associated with a first messaging service provider and a second network associated with a second messaging service provider,
updates the networks contacts database with contact information obtained from the first messaging service provider and the second messaging service provider,
maintains an aggregated contact list that comprises a first contact list associated with the contact information from the first messaging service provider and a second contact list associated with the contact information from the second messaging service provider,
stores the aggregated contact list in a non-transitory computer readable medium at the web server, and
provides the aggregated contact list to a display device.

2. The system of claim 1, further comprising a high level contacts database embodied in a non-transitory computer readable medium, wherein, in operation, contacts from the high level contacts database are included in the aggregated contact list.

3. The system of claim 1, wherein the network login engine includes a plurality of network login engines that include sufficient information to login or facilitate login to a respective plurality of low level networks.

4. The system of claim 1, further comprising a user profile database, embodied in a non-transitory computer readable medium and coupled to the network login engine, wherein, in operation, the user profile database includes a user-specific information that the network login engine uses to login or facilitate login to the one or more networks.

5. The system of claim 1, further comprising the display device.

6. The system of claim 1, further comprising the one or more networks.

7. A method comprising:
    joining a high level network;
    joining a first low level network associated with a first messaging service provider and a second low level network associated with a second messaging service provider;
    obtaining a first contact list associated with the first messaging service provider;
    obtaining a second contact list associated with the second messaging service provider;
    maintaining an aggregated contact that comprises the first contact list and the second contact list;
    logging into the high level network;
    displaying the aggregated contact list.

8. The method of claim 7, further comprising logging into the one or more low level networks.

9. The method of claim 7, further comprising joining an additional low level associated with an additional messaging service provider, wherein the aggregated contact list does not include contacts of the additional messaging service provider.

10. The method of claim 7, further comprising:
    logging into the first and second low level networks and an additional low level network associated with an additional messaging service provider;
    displaying contacts associated with the first, second, and additional messaging service providers in the aggregated contact list;
    logging out of the additional low level network.

11. The method of claim 7, further comprising logging out of the high level network.

* * * * *